N. L. Blanchard.
Oscillating Meter.

No. 101,347.        Patented Mar. 29, 1870.

Witnesses:        Inventor:
J. W. Coombs        N. L. Blanchard
Fred. Haynes        per Brown Coombs & Co.

United States Patent Office.

NATHANIEL L. BLANCHARD, OF SPUYTEN DUYVIL, NEW YORK.

*Letters Patent No. 101,347, dated March 29, 1870; antedated March 24, 1870.*

IMPROVEMENT IN WATER AND GAS-METERS.

The Schedule referred to in these Letters Patent and making part of the same.

*To all whom it may concern:*

Be it known that I, NATHANIEL L. BLANCHARD, of Spuyten Duyvil, in the county of Westchester and State of New York, have invented a new and useful Improvement in Water and Gas-Meters, of which the following is a full, clear, and exact description, reference being had to the accompanying drawing forming part of this specification, and in which—

Figure 2:
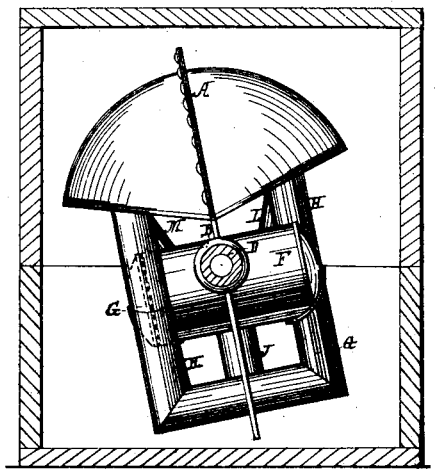
Figure 1:
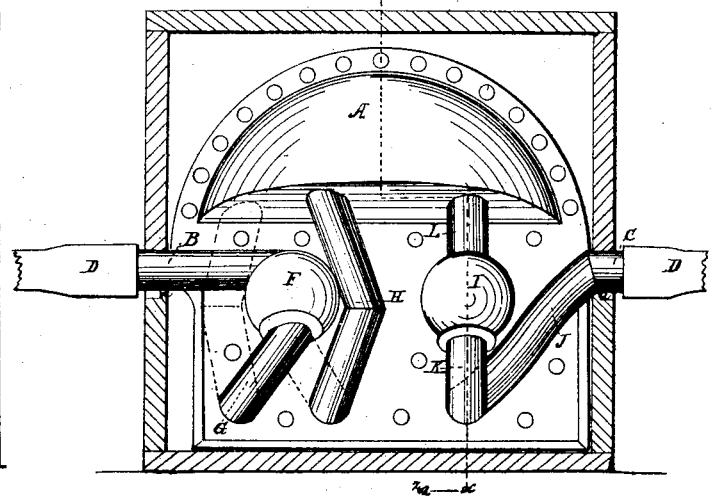
Figure 3:
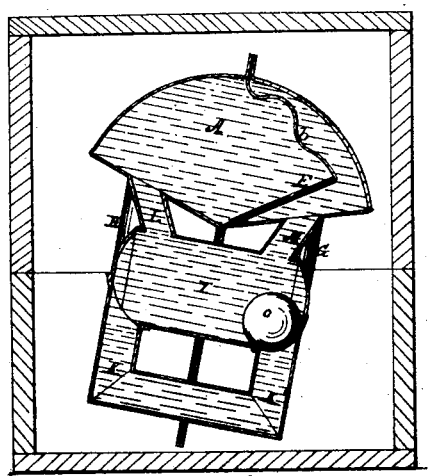
Figure 4:
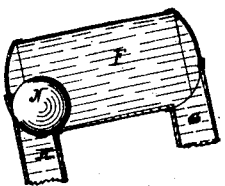

Figure 1 represents a side view of a meter constructed in accordance with my improvement;

Figure 2, an end view thereof;

Figure 3, a transverse section through the line *x x* in fig. 1, looking in direction of the arrow *z;* and Figure 4, a section at right angles to fig. 1, through the receiving-valve box or cylinder.

Similar letters of reference indicate corresponding parts.

My improvement has reference to that description of meters which tilt or tip alternately in reverse directions to keep up the supply to and discharge from a measuring-chamber or chambers arranged to lie on or over opposite sides of the tilting-axis. This action, as applied to water-meters, has usually been accomplished by the weight of the fluid, operating alternately on opposite sides of the axis of the meter, to destroy or change the balance, but all such or other similar methods dependent upon the weight of a fluid I discard, and effect the oscillation of the meter by the weight of a shifting diaphragm, arranged within the measuring-chamber, and serving by a flexible connection to divide said chamber into receiving and delivery-spaces alternately on opposite sides of the moving diaphragm, that in moving works or is thrown to opposite sides of the tilting-axis. Said diaphragm is thus operated by the flow of the fluid into and out of the meter, and to change the current therethrough, that is, to alternate the admission and discharge to and from opposite sides of the moving diaphragm, I employ in such connection valves operating by their gravity to con-control suitable inlets and outlets as the meter is tilted.

In describing the meter with reference to the accompanying drawing, it will suffice here to refer to it as used for measuring water.

A is the measuring-chamber, which is here shown as made in the form of a section of a sphere, but may be of any other desired shape.

B and C are the tilting or rocking trunnions to said chamber, resting in bearings *a a* of a box or case. The one, B, of these trunnions forms the inlet-pipe, and the other trunnion, C, the outlet-pipe to the measuring-chamber.

To connect these pipes with others having a fixed relationship, rubber or other suitable hose, D D may be used, which will twist or yield, and thus dispense with joints to provide for the rocking action of the meter.

E is the moving diaphragm, here shown as made up of metal plates, holding in between them a flexible strip, *b*, made fast at its edges to the measuring-chamber, intermediately of its width in the one direction, as represented in fig. 3, said diaphragm having a swinging or rocking action on a hinge-joint, as it were, to conform to the shape of the measuring-chamber, which if altered in form would require a different arrangement or attachment of the diaphragm.

F is the receiving-valve box or cylinder, which is set or arranged transversely to the rocking axis of the meter, and with which the inlet-pipe B connects.

This cylinder connects at its opposite ends with opposite sides of the measuring-chamber A; thus, the right-hand end of said valve-cylinder F connects by a pipe, G, with the left-hand side of the measuring-chamber, while the left-hand end of such cylinder connects by a pipe, H, with the right-hand side of said chamber.

I is the delivery-valve box or cylinder, also arranged transversely to the rocking axis of the meter, and connected at its opposite ends with the outlet-pipe or trunnion C by a pipe, J, and branches K K'.

This cylinder I communicates by branches L M in a direct manner with the measuring-chamber; that is, with the sides of the latter which correspond with or lie over the ends of said cylinder, instead of with opposite sides, as in the case of the receiving-valve cylinder.

These several cylinders and pipes or connections are all attached to or carried by the measuring-chamber, so as to tilt or rock with it, and the valve-cylinders or boxes provided with valves operating by their own gravity, and which are here shown as ball-valves, the one, N, of which controls the pipes G and H, which conduct the water alternately from opposite ends of said cylinder to the measuring-chamber, while the other valve, O, controls the outlet-branches K K', at opposite ends of the cylinder or valve-box I.

From this description it will be seen that, supposing the meter to be tilted to the position represented in fig. 2, the ball-valve N will have rolled so as to close the pipe H and open the pipe G, which causes the incoming fluid from the cylinder F to pass to the left-hand side of the measuring-chamber, in or toward which the diaphragm E has been thrown by the tilting of the meter.

Furthermore, the valve-box I, under such a position of the meter has its outlet-branch K' open and the outlet-branch K closed by the position given to the valve O. This causes the measuring-chamber to fill on the left-hand side of the diaphragm, and to empty from the right, thereby moving said diaphragm, the weight of which, after it passes a vertical position, operates to throw it to the opposite side of the measuring-chamber, and to tilt or rock the meter to a reverse position. This reversal causes the valves N and O to roll and change the communication of the inlets and outlets G H and K K' with the measuring-chamber, which accordingly fills and discharges from opposite sides, throwing the diaphragm to its first position again, and so on alternately, the measuring-chamber and its connections always keeping full of water and the tilting or rocking of the meter, to maintain action, being due exclusively to the weight of the diaphragm as it is worked or thrown to opposite sides of the tilting axis.

Any suitable indicator or registering device may be connected with the meter.

What is here claimed, and desired to be secured by Letters Patent, is—

1. The combination with a tilting or rocking measuring-chamber of a diaphragm, arranged and operating by its weight to rock the meter irrespective of the weight of the fluid passing therethrough, and serving to establish receiving and delivery-spaces alternately on opposite sides of the tilting axis, substantially as specified.

2. The combination with the tilting measuring-chamber and shifting diaphragm, operating by its weight to rock the meter, of valves arranged to act by their own gravity to control the several inlets and outlets as the meter is rocked, essentially as herein set forth.

3. The combination and arrangement of the rocking measuring-chamber A, the shifting diaphragm E, the rocking inlets and outlets B C, the valve-boxes or cylinders F I, with valves therein, and the several inlet-pipes or branches G H J K K' and L M, substantially as specified.

NATH. L. BLANCHARD.

Witnesses:
FRED. HAYNES,
J. W. COOMBS.